United States Patent [19]

Stidham et al.

[11] Patent Number: 5,533,662

[45] Date of Patent: Jul. 9, 1996

[54] EXOTHERMIC WELDING APPARATUS

[75] Inventors: Curtis R. Stidham, Parma; Robert McPherson, Jr., Aurora; Richard E. Singer, Beachwood, all of Ohio

[73] Assignee: Erico International Corp., Soloon, Ohio

[21] Appl. No.: 381,205

[22] Filed: Jan. 31, 1995

[51] Int. Cl.⁶ .................................................. B23K 23/00
[52] U.S. Cl. .................... 228/33; 228/234.3; 266/167; 164/341; 164/DIG. 12
[58] Field of Search ................ 228/33, 44.3, 198, 228/234.3; 164/DIG. 12, 110, 333, 341; 266/167; 104/15

[56] References Cited

U.S. PATENT DOCUMENTS

| | | | |
|---|---|---|---|
| 1,747,419 | 2/1930 | Bottrill | 164/DIG. 12 |
| 3,004,310 | 10/1961 | Burke | 164/54 |
| 3,022,554 | 2/1962 | Burke | 249/91 |
| 3,113,359 | 12/1963 | Burke | 164/333 |
| 3,234,603 | 2/1966 | Leuthy et al. | 164/108 |
| 3,255,498 | 6/1966 | Leuthy et al. | 164/332 |
| 4,879,452 | 11/1989 | Kovarik et al. | 228/234.3 |
| 4,881,677 | 11/1989 | Amos et al. | 228/234.3 |

OTHER PUBLICATIONS

Article CADWELD® Electrical Connections, Materials And Tools, Section A, pp. A1–A8, 1989, Erico Products Inc.

*Primary Examiner*—Samuel M. Heinrich
*Attorney, Agent, or Firm*—Renner, Otto, Boisselle & Sklar

[57] ABSTRACT

Exothermic welding apparatus includes a toggle frame jig for supporting vertically split molds. The toggle includes a post projecting parallel to the main pivot of the jig on which telescopes a crucible support. The crucible support includes a handle extending above the crucible when secured to the support. A quick acting toggle connects the support and post enabling the crucible to be assembled, cleaned, or prepared remote from the molds and then quickly installed and locked in position.

21 Claims, 3 Drawing Sheets

EXOTHERMIC WELDING APPARATUS

DISCLOSURE

This invention relates generally as indicated to exothermic apparatus and more particularly to an exothermic welding jig and molds for use with the jig.

BACKGROUND OF THE INVENTION

Exothermic welding has been widely employed in the formation of electrical connections or in the welding of steel such as rails and in joining reinforcing bar. The welding process utilizes powdered materials such as copper oxide and aluminum. The powdered material is placed in a crucible and ignited. Typically in electrical connections, the reduction of the copper oxide by aluminum produces molten copper and aluminum slag. Molten aluminum and molten iron may also be produced by related processes. The molten copper flows from the crucible over the parts to be welded. These parts are contained in a mold, melting them and welding them together. The slag of aluminum oxide which forms on top is removed and discarded. The process makes a high quality low impedance electrical connection. One typical application of this process is to make an electrical connection, such as a grounding connection, for example, to a steel column or fence post, or a connection where one of the conductors extends vertically. Welding metals or powders, and a wide variety molds and other related accessories to make these connections are sold under the registered trademark CADWELD® by Erico Inc. of Solon, Ohio.

Most typically the molds are formed by two semi-permanent graphite or ceramic blocks vertically split which are hollowed out to form the crucible, a receiving mold chamber for the pieces to be welded, and the interconnecting tap hole. The two mold blocks are opened and closed horizontally by a toggle action handle frame or clamp. Reference may be had to Burke U.S. Pat. Nos. 2,904,862 and 3,004,310 for illustrations of such exothermic cast welding mold assemblies. Where the mold parts are horizontally split, it is usual that the bottom of the block containing the crucible forms the top part of the mold while the other or lower part is hinged to separate from the top part. The two mold blocks are also supported for opening and closing by a toggle clamp opening and closing vertically.

A variety of mold supports may be employed to hold the mold assembly to a vertical surface. Typically a C-clamp, magnetic clamp, or even a chain sling or pipe clamp may be employed. Chain slings are typically used with mold assemblies for welding reinforcing bar such as shown in U.S. Pat. Nos. 3,234,603 and 3,255,498. In such patents the mold is in the form of a metal sleeve and separate molds are provided for the crucible and the tap hole or tundish, all of which may either be set one on top of the other or be held together by chain slings. The assembly and disassembly is time consuming, and more so in cramped quarters.

The semi-permanent molds may be cleaned and reused. Properly handled, used and cleaned, molds may make fifty or more connections. However, improperly used or cleaned molds have to be replaced more often. Also, the molds have to be replaced or changed for different types of connections. There are literally dozens of types of connections and within each type of connection classification there are a wide number of conductor size variations. Also, the weld metal or powder is carefully pre-packaged by size. While the mold forming parts which receive the parts to be welded and which form the weld, need to be carefully designed and machined, that is not necessarily true of the crucible, and yet the crucible may form the largest portion of the mold system. Where the mold part and crucible are formed from a common block of graphite, excessive wear or damage to any part of the mold part requires that the entire mold be discarded even though the crucible is still usable. In some situations, a different type of crucible may be required, such as one with an emissions filter, and as manufactured and sold by Erico, Inc. of Solon, Ohio under the registered trademark EXOLON®. Accordingly it would be advantageous to have a system where the crucible was separate from the mold forming parts and both the mold parts and crucible could be readily changed or substituted, while at the same time positioning and handling the crucible and mold parts for quick and convenient operation and cleaning for reuse.

If the crucible and mold are separable, it is important that when assembled they be held together with the proper degree of force so that no molten metal leakage occurs, and yet not too much force which might damage the mold parts, particularly if foreign matter is in the interface. It is also important that such force be quickly applicable or released, and readily adjustable. It is also important that when the jig is open, it not be loose. Looseness or slippage makes it more difficult to achieve proper conductor placement and to clean the molds after the weld.

It is also important that the jig or frame for holding the mold parts be low cost, able to separate and yet lock the mold parts quickly, and to hold the crucible for opening and closing travel, and for convenient cleaning, all while hot.

SUMMARY OF THE INVENTION

A welding jig includes supports for two mold parts and a separable crucible. The mold parts may be open and closed with a toggle frame mechanism while the crucible is held in place by a separate toggle. The crucible is supported on a guide tube which telescopes over a post projecting upwardly from the toggle frame mechanism. A handle is provided on the crucible guide tube or support extending above the crucible.

The crucible tube or support and crucible post are interconnected by a simple toggle pivoted to the post and snapping into a seat in the form of a hook projecting from the crucible tube. The toggle is adjustable and effective to press the crucible against the mold parts only when the mold parts and crucible are mounted on the apparatus. When the toggle is released the crucible, crucible tube, and handle may be removed as a unit. This enables the crucible to be mounted and removed from the crucible tube or support when the latter is disassembled from the jig. It also provides the crucible with an assembly and manipulation handle. It also permits the crucible to be prepared for welding at a more convenient location or height before being assembled and clamped to the closed molds.

The mold parts are right and left hand and are vertically split and preferably form a weld chamber opening to the side or bottom of the mold and offset from the tap hole. The toggle for opening and closing the mold parts includes a stiff pivot which removes any looseness or slip from the system even when open.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
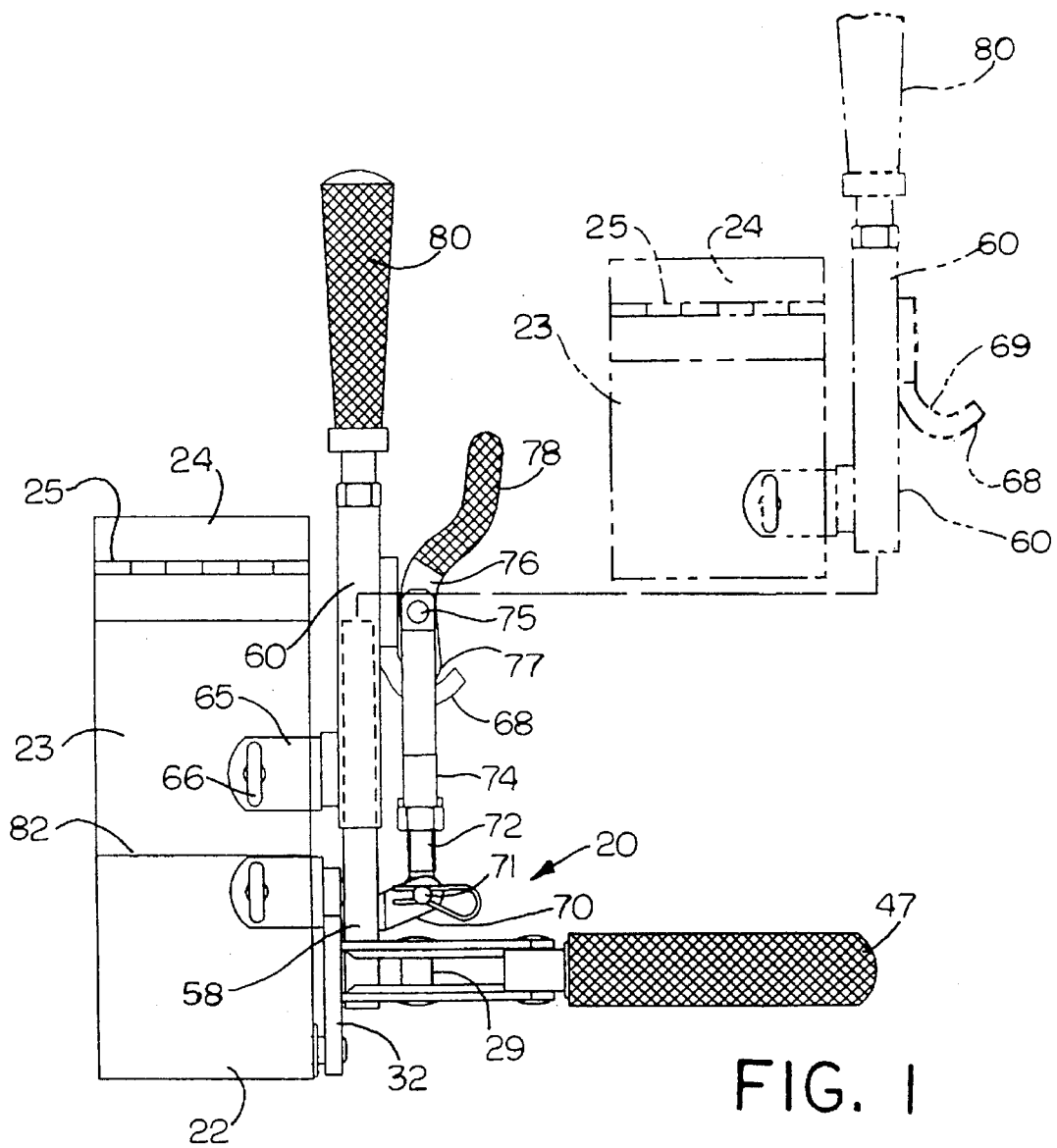
FIG. 1 is a side elevation of an apparatus in accordance with the present invention showing the crucible and its handle in phantom lines disassembled.

Referring initially to FIGS. 1–5, it will be seen that the apparatus of the present invention includes a jig shown generally at 20 adapted to support right and left hand vertically split mold parts 21 and 22, respectively, as well as a separable crucible 23 which includes a lid 24 hinged at 25.

In typical fashion, the crucible contains a chamber enlarging and opening at the top and narrowing at the bottom to funnel the molten metal contents through a relatively small tap hole into the weld chamber formed by the mold parts below. Typically, a small steel disk is employed to close the bottom of the crucible chamber and the exothermic material is then placed into the crucible chamber. A starting powder may then be placed on top of the exothermic material and when the lid is closed ignited with a flint gun. Alternatively, other forms of crucibles may be employed such as the aforenoted EXOLON® crucible having reduced emissions. The exothermic material may be ignited by a spark as with the flint gun or ignited electrically.

The jig 20 includes two toggle frame members shown generally at 27 and 28 to which the right and left hand mold parts are secured. The frame members are hinged or pivoted together about a main hinge pivot 29.

The hinge members include respective vertical extending plates 31 and 32. Studs 34 and 35 project from the plate 31 while studs 36 and 37 project from the plate 32. The top of each plate is provided with angle brackets as seen at 40 and 41, respectively, which are provided with thumb screws 42 and 43. The mold part 21 is provided with blind holes in the rear face into which the studs 34 and 35 project. The mold part is locked on the frame member by tightening thumb screw 42 into a hole in the side face. The mold part 22 is mounted on the studs 36 and 37 in the same way with the thumb screw 43 being tightened into a hole in the side to lock the mold part in place.

To operate the toggle frame members, each is provided with a toggle pivot handle as seen at 46 and 47, respectively. The pivot handles are pivoted to the respective frames at 48 and 49. Each handle includes an inwardly offset arm as seen at 51 and 52, respectively, the latter being an adjustment screw, and such arms are pivoted to each other at 53. Such pivot 53 may be provided with one or more Belleville washers 54. The Belleville washers act to stiffen the toggle system so that when released the parts of the toggle system will remain in the position where released. This avoids any looseness or slippage in the system and makes the system easier to handle and the mold parts easier to clean. The pivot may be formed by a rivet held under tension by the Belleville spring washers. The rivet is compressed to a given length which in turn compresses the Belleville washers by a calculated preset amount to maintain the desired spring tension to hold the frame in any desired position.

Figure 2:
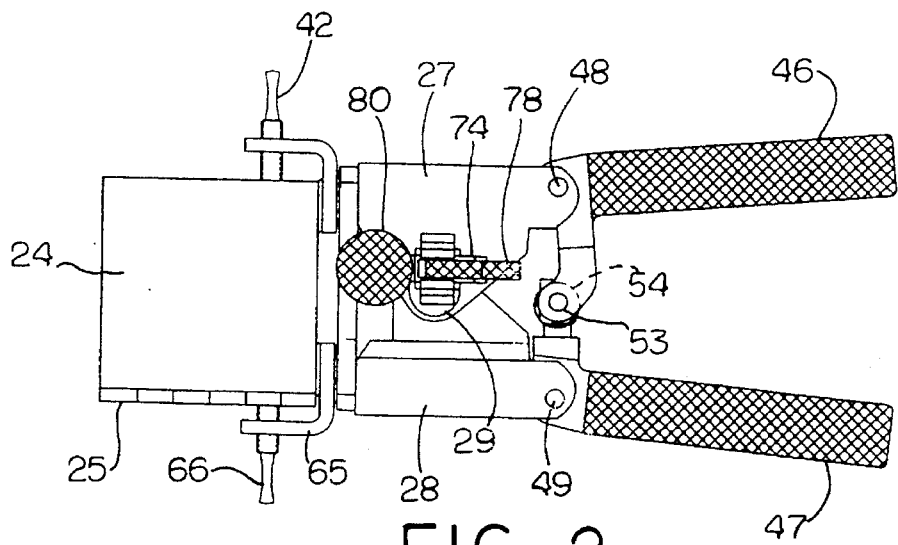
FIG. 2 is a top plan view of the apparatus.
Figure 3:
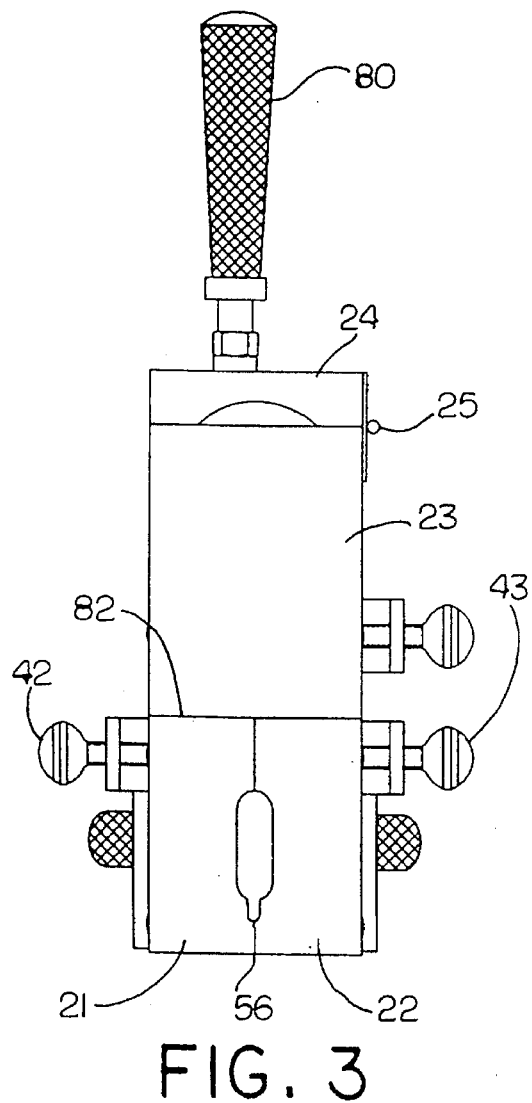
FIG. 3 is a front elevation of the apparatus as seen from the left hand side of FIG. 1 or FIG. 2.
Figure 4:
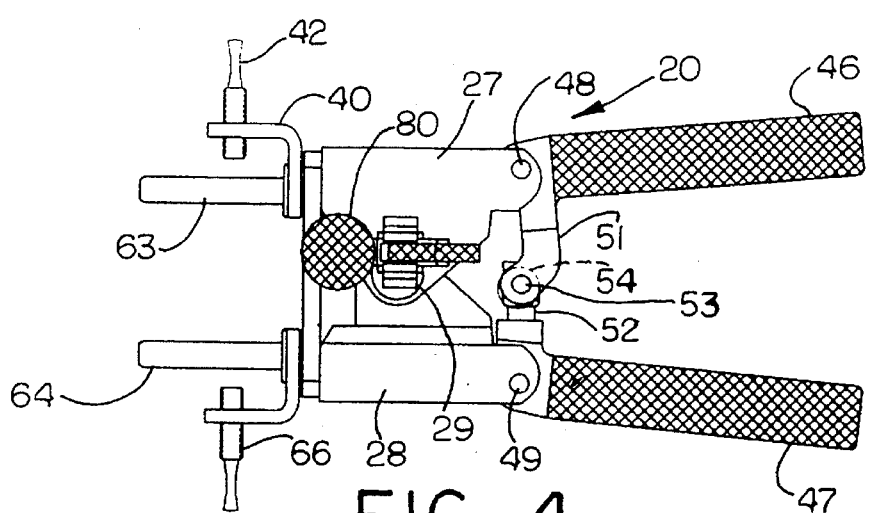
FIG. 4 is a top plan view of the apparatus, like FIG. 2, but without the molds and crucible.

It can be seen more clearly in FIGS. 2 and 4 that the frame is opened by pivoting the handles 46 and 47 away from each other. This then separates the mold parts 21 and 22. When the mold parts are locked together, the handles 46 and 47 are squeezed together moving the pivot 53 over center between the pivots 48 and 49 toggle locking the mold parts 21 and 22 against each other at the vertical parting surface 56 seen in FIG. 3.

Extending upwardly from the member 27 parallel to the main hinge pivot 29 is a crucible post 58 which may be in the form of a square tube. A crucible support 60 in the form of a slightly larger square tube telescopes over the post.

Figure 5:
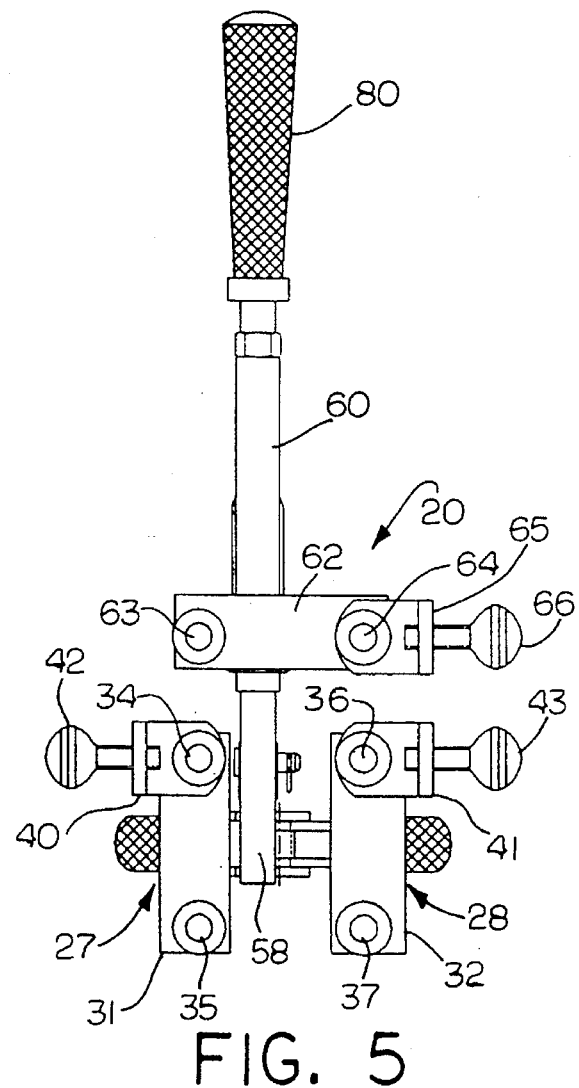
FIG. 5 is a front elevation of the apparatus, like FIG. 3, but without the molds and crucible.

As seen in FIG. 5, the crucible support tube 60 has secured to the lower end a horizontally elongated rectangular plate 62 from which projects studs 63 and 64. An angle bracket 65 is secured to the plate supporting thumb screw 66. The crucible 23 is provided with blind holes in the lower end thereof which receive the studs 63 and 64 and the thumb screw entering a hole in the side of the crucible serves to lock the crucible in place on the crucible support 60 when tightened. While the plate 62 is mounted on the front of the crucible support tube 60, a hook shown at 68 is mounted on the back. The hook has a rounded interior seat 69 perhaps best seen in the phantom line position of the crucible and crucible support in FIG. 1.

Projecting from the back of the post 58 as seen in FIG. 1 is a clevis 70 providing pivot 71 to which adjustment screw 72 is pivoted. The adjustment screw 72 is threaded into the bight portion of toggle clevis 74. The legs of the toggle clevis 74 are pivoted at 75 on opposite sides of toggle handle 76. The toggle handle includes a rounded lower end 77 adapted to seat inside the hook 68 and an upwardly offset handle 78. The outwardly offset toggle handle 78 extends to just below and to the rear handle 80 on top of the crucible support tube 60. Each of the handles shown may be provided with a heat and wear resistant grip.

The toggle handle 78 as illustrated in FIG. 1 is in its over-center locked position urging the crucible 23 against the closed mold parts 21 and 22. In FIG. 1, the contact point between the lower end of the handle and the hook 68 is just to the right of a line between the pivots 71 and 75. In other words, the pivot 75 is locked over center since it cannot go any further. The toggle may quickly be opened simply by pulling the handle 78 away from the handle 80 or the top of the crucible support tube 60. When opened, the toggle will simply drop about the pivot 71 and the entire crucible including the crucible support may be removed as seen by the phantom line position.

It is noted that when the toggle handle is closed and locked as seen in FIG. 1, a controlled pressure is provided at the mold part and crucible interface indicated at 82. However, the pressure is not so much that damage to the molds will occur. Nor is the pressure so much to preclude the mold parts from opening beneath the crucible when in position. Accordingly, the crucible may be placed in position and locked in place before the mold parts are completely closed on the parts to be welded.

Figure 6:
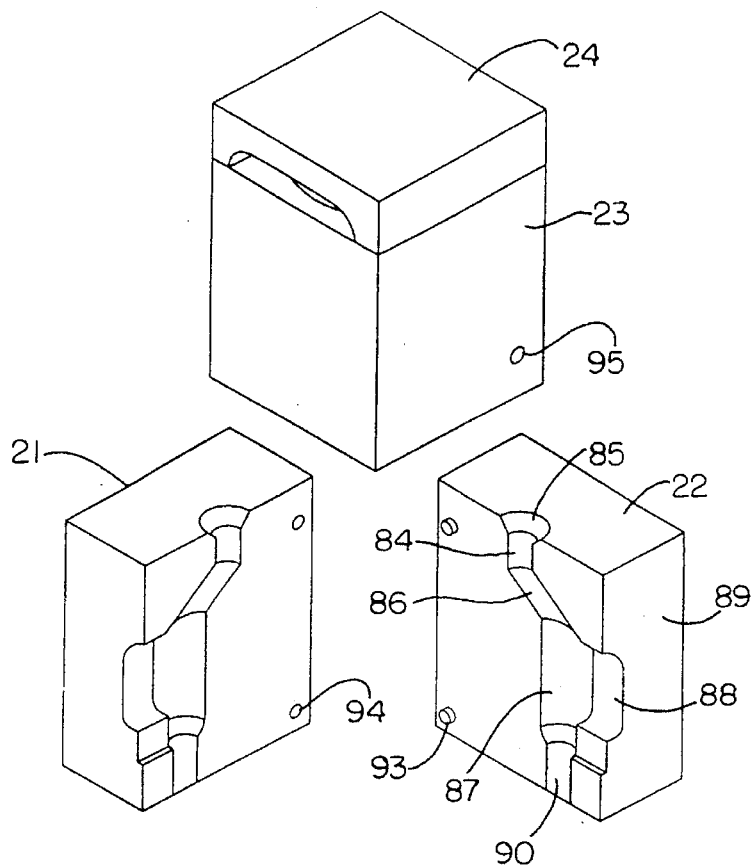
FIG. 6 is an exploded view of an exemplary set of molds.

Referring now to FIG. 6, there is illustrated an exploded view with the mold parts 21 and 22 opened and the interface exposed. In the embodiment illustrated in FIG. 6, the two mold parts are a mirror image of each other and accordingly the described parts in one mold part will fit and mate with the same parts in the opposite mold part to form the runners, weld chamber, and sleeving for the parts to be joined. The mold part 22 includes at its upper end a semi-circular passage 84 which has a relieved top edge 85 communicating with the tap hole in the bottom of the crucible 23. The passage 84 communicates with inclined passage 86 leading into weld chamber 87. The weld chamber includes a key hole slot 88 opening through the front 89 of the mold. Sleeving extending from the bottom of the weld chamber indicated at 90 is adapted to receive and grip around a vertically extending conductor projecting into the weld chamber. It is noted that the weld chamber is cylindrically enlarged with respect to the conductor which enters the weld chamber. The enlargement in any weld chamber forms an outer sleeving on the weld to provide strain relief for the weld. The exposure of the weld chamber through the front of the mold permits a weld to be formed between a conductor grasped by the sleeving 70 and a vertical surface to which the entire apparatus may be clamped as aforenoted either by a C-clamp, a chain clamp, or a magnetic clamp. The mold shown makes a connection between a vertical surface and a parallel conductor. Also, as seen in FIG. 6, the mold parts are provided with pilot pins 93 which enter pilot holes 94 to assist in holding the mold parts in proper alignment. It is further noted that FIG. 6 illustrates the hole in 95 in the side of the crucible 23 to receive the thumb screw 66.

Figure 7:
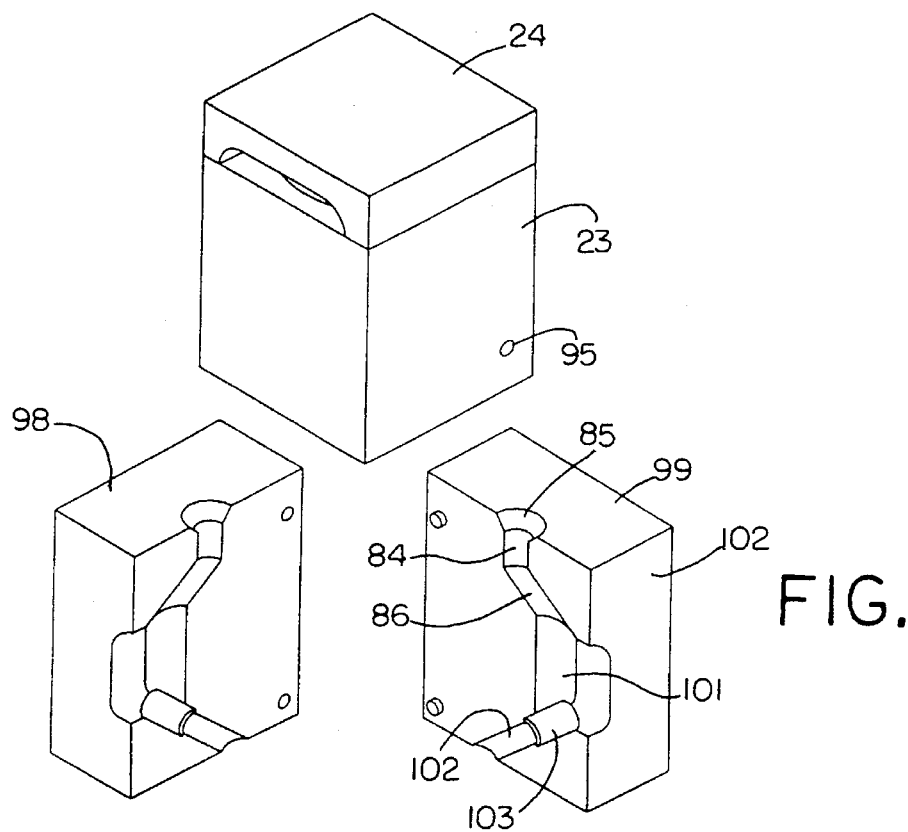
FIG. 7 is a similar view of such molds slightly modified.

In FIG. 7, the mold parts 98 and 99 are generally similar including passages formed by the recesses 84 and 86, the former being relieved at 85, lead and to weld chamber 101. At the bottom of the weld chamber there is provided inclined sleeving 102 and a cylindrical enlargement 103 communicating with the weld chamber 101, again exposed through the front wall 102 of the mold part. In this manner, an inclined conductor may be received in the sleeving 102 and when the mold parts are closed and with the conductor inserted properly into the weld chamber, the inclined conductor will be welded to the face of a vertical structure to which the apparatus is clamped. The mold shown in FIG. 7 makes a connection between a vertical surface and a conductor at an angle to such vertical surface. It will be appreciated that many other types of connections may be made with the apparatus and jig of the present invention.

It can now be seen that with the present invention the crucible may quickly and easily be attached to and released from the frame. Accordingly, the crucible or the mold parts may quickly be substituted. Since the crucible normally lasts longer than the mold parts, if one of the mold parts wears out, the part need simply be replaced. Moreover, the mold parts for a wide variety of connections are of generally standard or uniform overall dimensions and this makes the jigging and fixturing of the mold parts in the machines which form the passages and weld chambers much easier, thus lowering the cost of the mold parts and enabling quicker delivery. Another advantage of the apparatus is that when the mold parts are open to any extent the system is not loose nor will the parts slip, greatly facilitating the placement of the conductors to be welded and the subsequent cleaning, inspection or servicing of the mold parts and crucible.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. Exothermic welding apparatus having a toggle frame comprising respective frame members for holding separable mold parts for opening and closing said members being interconnected at a hinge pivot, means on said members releasably holding a mold part, a post extending from one of said members parallel to the axis of the hinge pivot, a crucible support mounted on said post for movement therealong, means on said crucible support releasably holding a crucible, and means to urge said crucible support and thus said crucible toward the mold parts.

2. Apparatus as set forth in claim 1 wherein said means on said crucible support comprises a toggle clamp effective to press the crucible against the mold parts.

3. Apparatus as set forth in claim 2 wherein said toggle clamp includes an adjustable link pivoted to said post, and a handle link, pivoted to said adjustable link.

4. Apparatus as set forth in claim 3 including a hook extending from said crucible support, said handle link engaging said hook to lock said crucible against the mold parts.

5. Apparatus as set forth in claim 2 wherein said crucible support is hollow and telescopes over said post.

6. Apparatus as set forth in claim 3 wherein said crucible support includes a handle projecting above the crucible when secured to the crucible support.

7. Apparatus as set forth in claim 6 wherein said post and crucible support are rectangular in cross section.

8. Apparatus as set forth in claim 7 wherein said mold parts include a tap hole adapted to communicate with the crucible, and a weld chamber, vertically offset from the tap hole, and openings communicating with the weld chamber through a side and bottom of the mold parts when closed.

9. Apparatus as set forth in claim 1 including toggle handles for said members pivoted to the respective members and to each other forming the toggle frame, at least one of said pivots being a stiffening pivot to hold said toggle frame in any open position when released.

10. Exothermic welding apparatus comprising first means for opening and closing two mold parts on a vertical parting plane, second means mounted on said first means for supporting a crucible for movement toward and away from said mold parts, and in alignment with said mold parts when closed.

11. Apparatus as set forth in claim 10 wherein said first means comprises a toggle frame having a main pivot, and said second means comprises a post extending from said frame parallel to the axis of said main pivot.

12. Apparatus as set forth in claim 11 including a crucible support telescoped on said post.

13. Apparatus as set forth in claim 12 including a toggle clamp connecting said crucible support and post.

14. Apparatus as set forth in claim 13 wherein said post and crucible support are rectangular in cross section.

15. Apparatus as set forth in claim 14 wherein said crucible support includes a handle projecting above the crucible when the latter is secured to the crucible support.

16. Apparatus as set forth in claim 15 wherein said toggle clamp includes an adjustable link pivoted to said post, and a handle link pivoted to said adjustable link.

17. Apparatus as set forth in claim 16 including a hook extending from said crucible support, said handle link engaging said hook to lock said crucible against the mold parts.

18. Apparatus as set forth in claim 17 wherein said mold parts include a tap hole adapted to communicate with the crucible, and a weld chamber, vertically offset from the tap hole.

19. Apparatus as set forth in claim 18 including openings communicating with the weld chamber through a side and bottom of the mold parts when closed.

20. Apparatus as set forth in claim 11 wherein said toggle frame includes a pair of pivot handles pivoted to said frame and to each other to open, close and lock said mold parts.

21. Apparatus as set forth in claim 11 wherein said toggle frame includes a stiffening pivot to hold said frame in any open position when released.

* * * * *